Dec. 23, 1958    M. A. THORNE    2,865,436
SEAT

Filed Sept. 27, 1954    3 Sheets-Sheet 1

INVENTOR
Maurice A. Thorne
BY
Paul Fitzpatrick
ATTORNEY

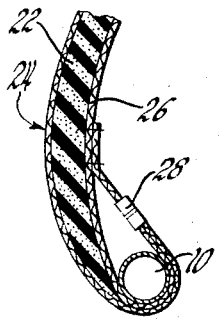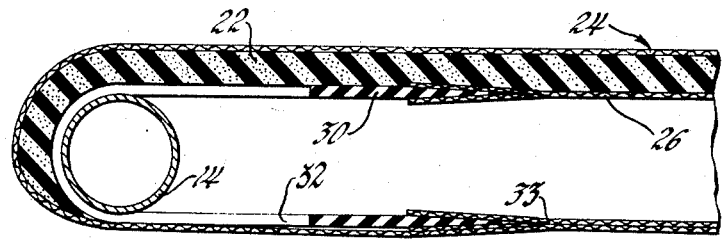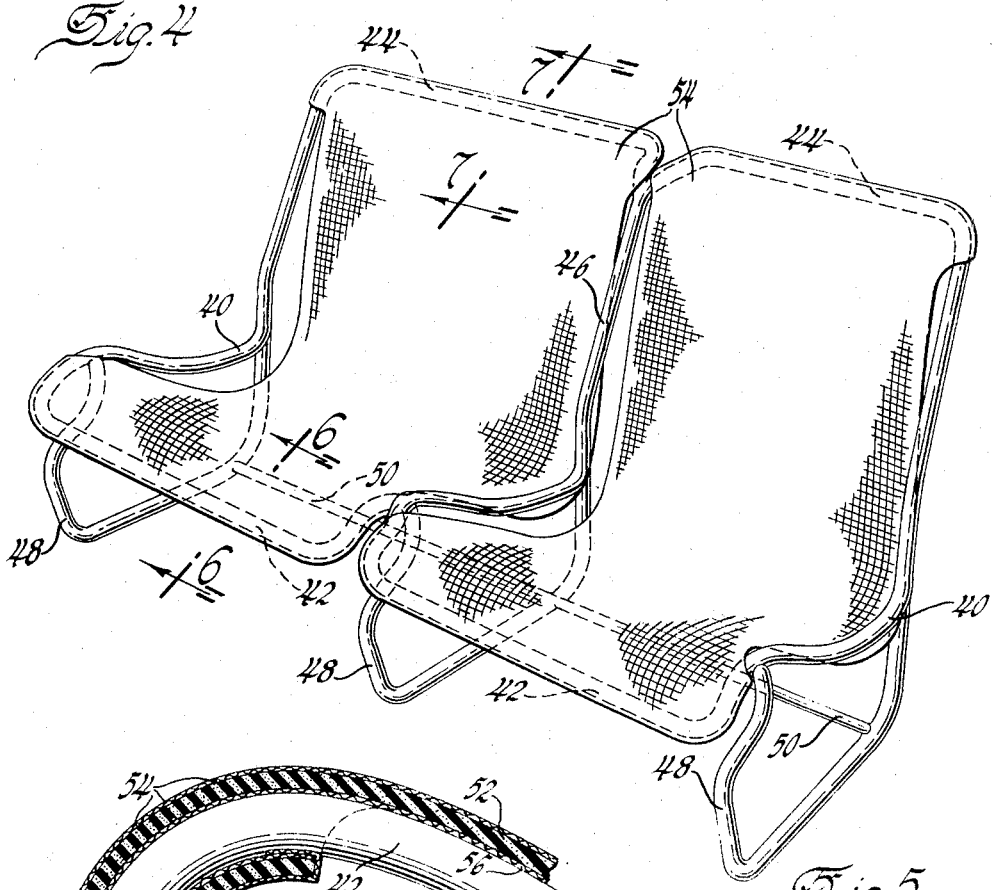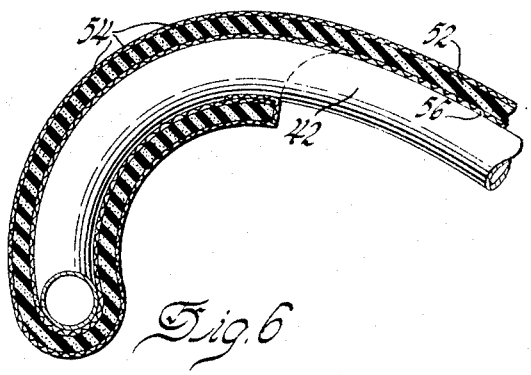

Dec. 23, 1958   M. A. THORNE   2,865,436
SEAT
Filed Sept. 27, 1954   3 Sheets-Sheet 3
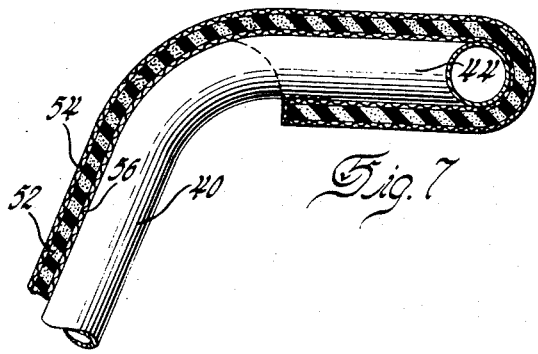
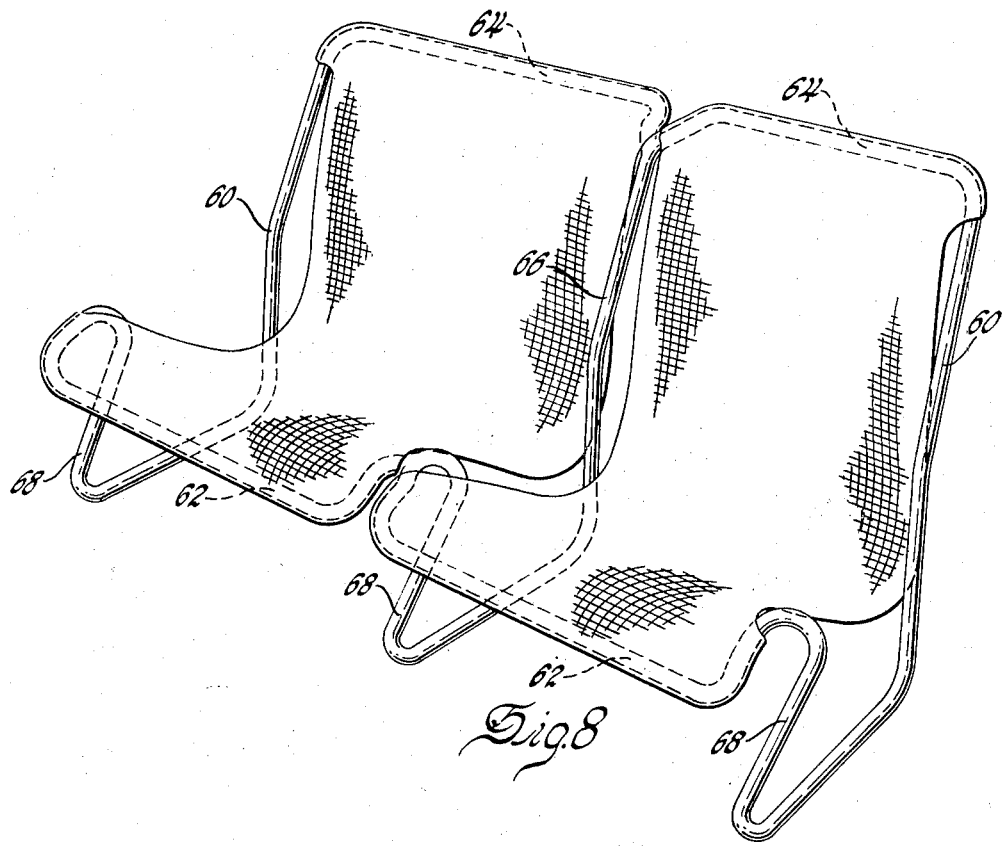
INVENTOR
Maurice A. Thorne
BY
Paul Fitzpatrick
ATTORNEY

United States Patent Office 2,865,436
Patented Dec. 23, 1958

2,865,436

SEAT

Maurice A. Thorne, Detroit, Mich., assignor to General Motors Corporation, Detroit, Mich., a corporation of Delaware Application September 27, 1954, Serial No. 458,377

2 Claims. (Cl. 155—184)

This invention relates to a seat, and more particularly to a seat especially adapted for use in an automobile.

One feature of the invention is that it provides an improved seat; another feature of the invention is that it provides a seat including a padding member and an outer covering of resilient, two-way stretchable fabric on the padding member and means for securing the padding member and cover to a peripheral frame; a further feature of the invention is that the padding member may comprise a sheet of sponge rubber, which, in combination with the two-way stretchable fabric cover provides a comfortable, economically manufactured seat; still another feature of the invention is that the padding covering and backing may be formed with pockets at the front and rear sides and at the corners for securing the seating member to the peripheral frame; yet a further feature of the invention is that rubber tensioners may be provided at the sides of the seat for regulating the tension of the resilient padding member; still another feature of the invention is that these tensioners may be slotted to provide the proper amount of tension therein; and an additional feature of the invention is that zippers may be provided for securing the cushion to the peripheral frame.

In modified forms of the invention, novel improved peripheral frames are provided.

Other features and advantages of the invention will be apparent from the following description and from the drawings, in which:

Fig. 3 is an enlarged fragmentary section through a portion of the back of the seat taken along the line 3—3 of Fig. 1;

Fig. 4 is an enlarged fragmentary section taken along the line 4—4 of Fig. 1;

Fig. 5 is a front perspective view of a modified form of the invention comprising a double seat frame;

Fig. 6 is an enlarged fragmentary section taken along the line 6—6 of Fig. 5;

Fig. 7 is an enlarged fragmentary section taken along the line 7—7 of Fig. 5; and Fig. 8 is a front perspective view of a further modified form of double seat frame.

Figure 1:
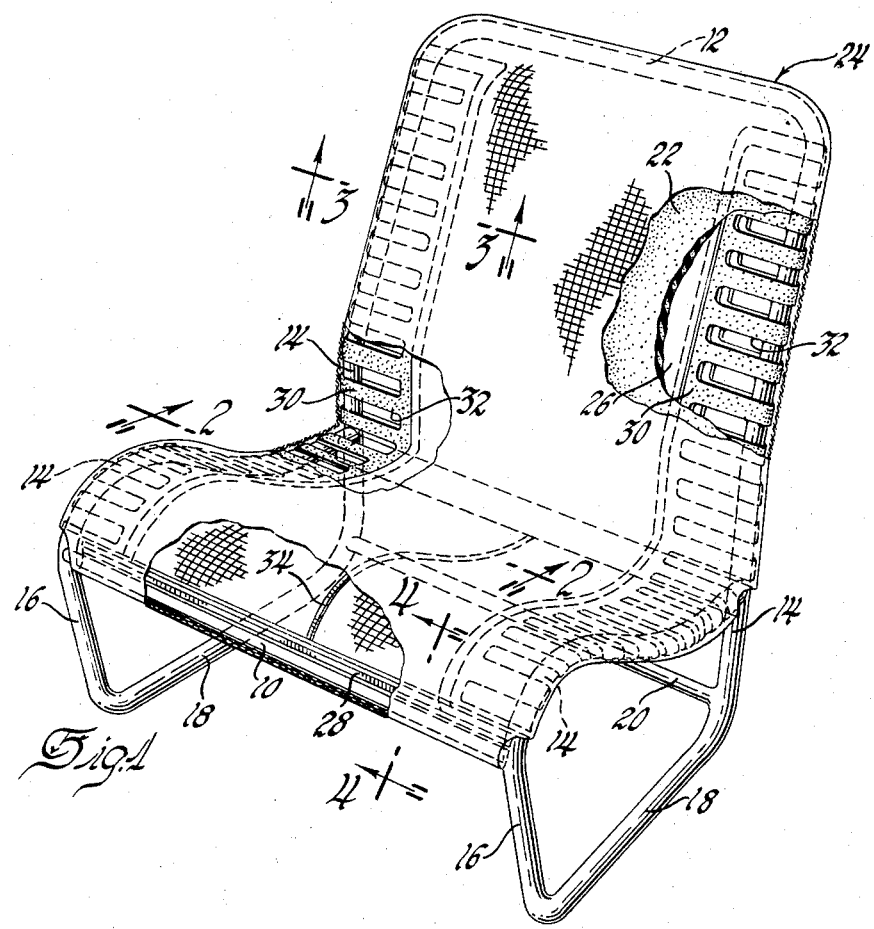
Fig. 1 is a front perspective view of a seat embodying the invention, portions of the seat being broken away to show underlying structure.
Figure 2:
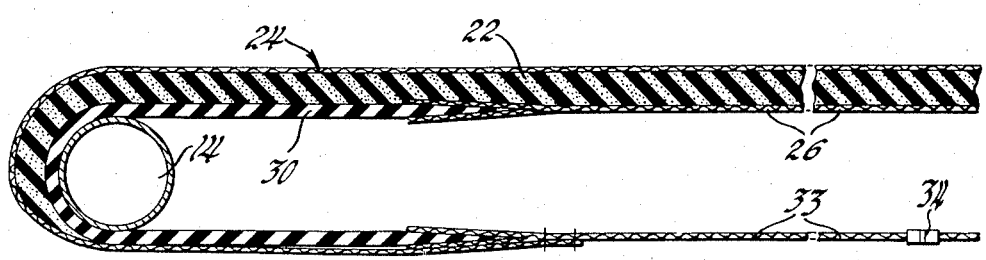
Fig. 2 is an enlarged fragmentary section taken along the line 2—2 of Fig. 1.

Referring now more particularly to the drawings, in the seat shown in Figs. 1-4 there is a peripheral frame including a front member 10, a rear member 12 and opposite side members 14 which are bent to form legs 16 and floor supports 18. A transverse brace 20 connects the opposite sides of the frame adjacent the rear of the floor supports 18. The peripheral frame preferably is formed of tubular aluminum.

Within the peripheral frame there is a flexible, resilient padding sheet member 22, preferably formed of unicellular sponge rubber, which may be of the order of one-quarter inch thick. As shown in Figs. 1 and 4, the opposite ends of the sheet 22 overlie the frame members at the front and rear.

An outer decorative covering 24 of resilient, two-way stretchable material overlies the padding member 22 and extends beyond the edges thereof as shown in Figs. 3 and 4. On the undersurface of the padding member 22 there is secured a backing member 26 of impregnated fabric. This backing member is moderately resilient.

As shown in Fig. 1, the flexible seat cushion is secured to the frame at the top by slipping the cushion over the top frame member 12. At the bottom a zipper 28 (see Fig. 4) extends transversely across the seat and provides means for securing the cushion to the front side frame member 10.

Along each side of the padding member 22 there is secured, as by vulcanizing, an elongated rubber tensioner 30. This tensioner is formed with a plurality of slots 32 extending transversely inwardly from the adjacent side frame member. The number and width of the slots determines the amount of tension exerted by each of the tensioners 30. The tensioners extend over the side frame members 14 and are secured at their underside to a fabric backing 33 which carries a zipper 34 extending longitudinally along the center of the seating portion. In order to assemble the cushion on the frame, it is merely necessary to slip the cushion structure over the back of the frame and then secure the zippers 28 and 34. In the event it is desired to remove the cushion for the purpose of repair or cleaning, the zippers 28 and 34 can be unfastened and the cushion can be easily removed.

Fig. 5 shows a modified form of the invention, including a double frame and a seat in which the rubber tensioners and zippers are omitted and the cushion is secured to the frame by pockets which are formed at the front and rear sides and the corners and which slip over the front and rear frame members.

In Fig. 5 the frame forms a double seat having two seating portions. Each seating portion has a longitudinal side member 40, a front member 42 and a rear member 44. A longitudinal member 46 divides the two seating portions. The member 46 is molded integrally with or connected to the separate front and rear members of both portions of the frame. Separate leg and floor support members 48 are secured to and extend downwardly from the side members 40 and the dividing member 46, and transverse supports 50 are provided across the rear portion of the floor supports.

In this form of the invention there is a flexible resilient padding member 52, which is similar to the padding member 22 of Figs. 1-4, except that the padding member 52 does not overlie the side frame members 40 or the central dividing frame member 46 except at the front and rear corners where pockets are formed for securing the pad to the frame. The padding member 52 is covered with a decorative cover 54, which may be similar to the cover 24 of Figs. 1-4, and a backing member 56 is provided which may be similar to the backing member 26. Figs. 6 and 7 show how the cushion portion of the seat is formed into pockets at the front and rear, these pockets receiving the respective front and rear frame members and the four corners of each portion of the seat and forming means for securing the padding member, cover and backing member to the frame.

Fig. 8 shows another modified form of peripheral frame in which the side members and dividing members of the frame have integral downwardly bent portions forming leg and floor supports. In Fig. 8 the double seat frame has two seating portions, each with a longitudinal side member 60, a front member 62 and a rear member 64. A longitudinal dividing member 66 separates the two seating portions.

In this embodiment of the invention, the side members and the dividing member of the frame have integral downwardly bent portions 68 forming leg and floor supports. This construction simplifies the frame and makes it possible to form each frame portion out of a single piece of metal tubing. In this form of the invention, the seat cushion is formed and supported on the frame in the same manner, as in the embodiment of Figs. 5, 6 and 7.

While I have shown and described certain embodiments of my invention, it is capable of many modifications. Changes, therefore, in the construction and arrangement may be made without departing from the spirit and scope of the invention as set forth in the appended claims.

I claim:

1. A seat of the character described, including: a peripheral frame having front, back and opposite side members; a flexible sponge rubber padding sheet member of substantially uniform thickness within said frame, said padding member having front and rear end portions overlying the front and back members of the frame and said padding member having side portions of said substantially uniform thickness wrapped at least partially around said opposite side members of the frame; an outer covering of resilient two-way stretchable sheet material on said padding member; means for securing the padding member and cover to the front and back members of the frame; a rubber tensioner sheet secured to said padding member at each side thereof and underlying the padding member within the boundaries of the frame, each tensioner being wrapped around the adjacent side member of the frame between said side member and said padding member and each tensioner being formed with a plurality of slots extending transversely of the frame; and means secured to the tensioners for joining said tensioners beneath the padding member.

2. Apparatus of the character claimed in claim 1, wherein said last means comprises a fabric backing piece secured to each tensioner and releasable fastening means having portions on each fabric backing piece.

References Cited in the file of this patent

UNITED STATES PATENTS

| | | |
|---|---|---|
| 2,233,986 | Leech | Mar. 4, 1941 |
| 2,565,870 | McGuire | Aug. 28, 1951 |
| 2,574,367 | Zeisel | Nov. 6, 1951 |
| 2,590,504 | Caesar | Mar. 25, 1952 |
| 2,644,508 | Weill | July 7, 1953 |
| 2,659,419 | Waldheim et al. | Nov. 17, 1953 |